| | |
|---|---|
| (12) United States Patent<br>Gulko | (10) Patent No.: US 9,332,024 B1<br>(45) Date of Patent: May 3, 2016 |

(54) UTILIZING DIGITAL LINEAR RECURSIVE FILTERS TO ESTIMATE STATISTICS FOR ANOMALY DETECTION

(71) Applicant: EMC Corporation, Hopkinton, MA (US)

(72) Inventor: Eugene Gulko, Campbell, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/557,559

(22) Filed: Dec. 2, 2014

(51) Int. Cl.
*H04L 29/06* (2006.01)
*H04L 12/26* (2006.01)
*G06F 21/55* (2013.01)
*G06F 21/50* (2013.01)

(52) U.S. Cl.
CPC ............ *H04L 63/1425* (2013.01); *H04L 43/10* (2013.01); *G06F 21/50* (2013.01); *G06F 21/552* (2013.01); *G06F 21/554* (2013.01); *H04L 63/0227* (2013.01); *H04L 63/14* (2013.01); *H04L 63/1416* (2013.01); *H04L 63/20* (2013.01)

(58) Field of Classification Search
CPC ............ H04L 63/1416; H04L 63/1425; H04L 63/0227; H04L 63/20; H04L 63/14; H04L 43/10; G06F 21/50; G06F 21/552; G06F 21/554
See application file for complete search history.

(56) References Cited

U.S. PATENT DOCUMENTS

| | | | |
|---|---|---|---|
| 6,839,850 B1 * | 1/2005 | Campbell | G06F 21/55 709/223 |
| 8,776,168 B1 | 7/2014 | Gibson et al. | |
| 2009/0328209 A1 | 12/2009 | Nachenberg | |
| 2010/0125911 A1 * | 5/2010 | Bhaskaran | G06Q 10/10 726/23 |
| 2012/0185945 A1 | 7/2012 | Andres et al. | |

OTHER PUBLICATIONS

D. Canali et al., "On the Effectiveness of Risk Prediction Based on Users Browsing Behavior," Proceedings of the 9th ACM Symposium on Information, Computer and Communications Security, Jun. 2014, pp. 171-182.
Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.
F. Benevenuto et al., "Characterizing User Behavior in Online Social Networks," Proceedings of the 9th ACM SIGCOMM Conference on Internet Measurement Conference (IMC), Nov. 2009, pp. 49-62.

(Continued)

*Primary Examiner* — Kaveh Abrishamkar
*Assistant Examiner* — Ayoub Alata
(74) *Attorney, Agent, or Firm* — Ryan, Mason & Lewis, LLP

(57) ABSTRACT

A method is provided to estimate statistics of user interaction with a computing system. For example, the method includes tracking the interaction of a plurality of users with the computing system to collect statistical data associated with the user interaction, wherein the statistical data is collected in each of a plurality of sampling intervals. The collected statistical data is applied to a digital linear recursive filter that is configured to combine and filter the collected statistical data based on at least one cyclical function. The filtered statistical data generated by the digital linear recursive filter is then utilized to compute final statistics indicative of the user interaction with the computing system. The final statistics are utilized to identify anomalous activity involving the computing system.

20 Claims, 4 Drawing Sheets

(56) References Cited

OTHER PUBLICATIONS

A. Soule et al., "Combining Filtering and Statistical Methods for Anomaly Detection," USENIX Association, Proceedings of the 5th Conference on Internet Measurement, Oct. 2005, pp. 331-344.

A.K. Ghosh et al., "Detecting Anomalous and Unknown Intrusions Against Programs," Proceedings of the 14th Annual Computer Security Applications Conference (ACSAC), Dec. 1998, pp. 259-267.

M.A. Gómez-Villegas et al., "Reconciling Bayesian and Frequentist Evidence in the Point Null Testing Problem," TEST: An Official Journal of the Spanish Society of Statistics and Operations Research, Feb. 1998, pp. 207-216, vol. 7, No. 1.

Aurobindo Sundaram, "An Introduction to Intrusion Detection," Crossroads—Special Issue on Computer Security, Mar. 1996, pp. 3-7, vol. 2, No. 4.

E. Adar et al., "Why We Search: Visualizing and Predicting User Behavior," Proceedings of the 16th International Conference on World Wide Web (WWW), May 2007, pp. 161-170, Banff, Alberta, Canada.

S.A. Khayam et al., "Using Session-Keystroke Mutual Information to Detect Self-Propagating Malicious Codes," IEEE International Conference on Communications (ICC), Jun. 2007, pp. 1385-1390, Glasgow, Scotland.

Y. Diao et al., "Quantifying the Complexity of IT Service Management Processes," Proceedings of the 17th IFIP/IEEE International Conference on Distributed Systems: Operations and Management (DSOM), Oct. 2006, pp. 61-73, Dublin, Ireland.

Wikipedia, "Kalman Filter," http://www.en.wikipedia.org/wiki/Kalman_filter, Nov. 2014, 32 pages.

\* cited by examiner

UTILIZING DIGITAL LINEAR RECURSIVE FILTERS TO ESTIMATE STATISTICS FOR ANOMALY DETECTION

FIELD

The field relates generally to computer networks, and in particular, to techniques for estimating statistics for use in applications such as detecting anomalous activity in a computer network.

BACKGROUND

Computer networks are often configured to incorporate network security systems in order to detect anomalous activity or otherwise protect the networks against malicious activity, such as deployment of malware or propagation of viruses by attackers. In general, network security systems are typically implemented as rule-based systems or statistical-based systems, or a combination of both. A rule-based network security system typically relies on extensive sets of signatures or other security rules in order to detect malicious activity in network traffic. These rules in many cases are generated by domain experts and manually added into the system. Individual rules can be highly specific to detection of particular malicious activity scenarios, while other rules include behavioral rules that are configured to detect anomalous or suspicious activities, such as an unusual amount of extracted data.

On the other hand, statistical-based network security systems utilize statistical algorithms to learn network traffic patterns and activity for a given network and establish a baseline of "normal" network activity for the given network. A statistical-based network security system will monitor network traffic and activity to collect information that is processed against the established baseline to detect anomalous network activity. The efficacy and usefulness of a statistical-based network security system is based primarily on the ability of the system to learn normal patterns of network traffic and activity for a given network, which is not a trivial matter as most networks are extremely dynamic and diverse with regard to protocols, configurations, services provided, and usage times, etc.

SUMMARY

Illustrative embodiments of the invention provide techniques for estimating statistics of network activity in a computer network, wherein the statistics are utilized to detect anomalous activity in the computer network. In one embodiment, a method is provided to estimate statistics of user interaction with a computing system. The method includes tracking the interaction of a plurality of users with the computing system to collect statistical data associated with the user interaction, wherein the statistical data is collected in each of a plurality of sampling intervals. The collected statistical data is applied to a digital linear recursive filter that is configured to combine and filter the collected statistical data based on at least one cyclical function. The filtered statistical data generated by the digital linear recursive filter is then utilized to compute final statistics indicative of the user interaction with the computing system. The final statistics are utilized to identify anomalous activity involving the computing system.

In another embodiment of the invention, the at least one cyclical function of the digital linear recursive filter comprises a weighted function of a daily cycle, or a weighted function of a weekly cycle, or both. In one embodiment, each sampling interval has a predefined period of about one hour or less.

In another embodiment of the invention, the digital linear recursive filter is further configured to combine and filter the collected statistical data based on a decay function, wherein the decay function is based on an exponential of a ratio of a predefined time period of each sampling interval to a predefined half-life time constant of the collected statistical data. In one embodiment, the half-life time constant is about one week.

In yet another embodiment of the invention, tracking the user interaction with the computing system includes tracking one or more pre-specified events, and accumulating a number of occurrences of each of the one or more pre-specified events in each of the plurality of sampling intervals. The filtered statistical data is then utilized to compute a categorical probability distribution for each of the one or more pre-specified events.

In another embodiment of the invention, tracking the user interaction with the computing system includes tracking one or more pre-specified numerical parameters, and accumulating a total amount of each of the one or more pre-specified numerical parameters in each of the plurality of sampling intervals. The filtered statistical data is then utilized to compute a statistical mean of each of the one or more pre-specified numerical parameters.

Other embodiments of the invention include, without limitation, apparatus, computer networks, systems and articles of manufacture comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices. Moreover, the phrases "computing system" and "data storage system" as used herein are intended to be broadly construed, so as to encompass, for example, private or public cloud computing or storage systems, as well as other types of systems comprising distributed virtual and/or physical infrastructure.

Figure 1:
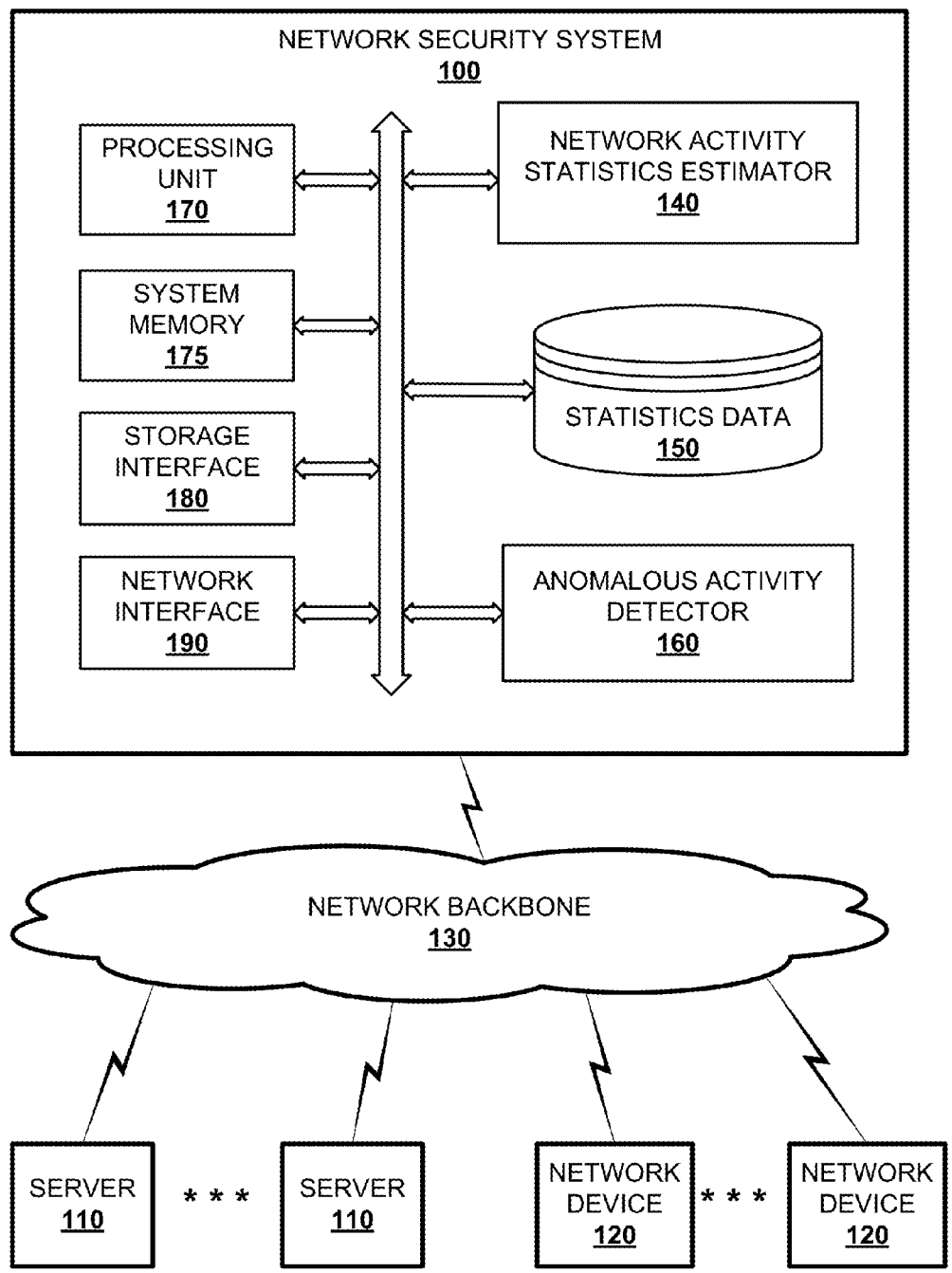
FIG. 1 illustrates a computing system which implements a network security system according to an embodiment of the invention.

FIG. 1 illustrates a computing system 10 which implements a network security system according to an embodiment of the invention. More specifically, FIG. 1 illustrates a computing system 10 comprising a network security system 100, a plurality of servers 110, and a plurality of network devices 120. The servers 110 and network devices 120 communicate over a network 130. The network devices 120 may comprise, for example, client devices, network appliances or other types of network devices, in any combination. Such devices are examples of what are more generally referred to herein as "processing devices."

The network 130 may comprise, for example, a global computer network such as the Internet, a wide area network (WAN), a local area network (LAN), a satellite network, a telephone or cable network, a cellular network, a wireless network such as a Wi-Fi or WiMAX network, or various portions or combinations of these and other types of networks. The network 130 in some embodiments therefore comprises combinations of multiple different types of communications networks each comprising network devices configured to communicate using Internet Protocol (IP) or other related communication protocols.

In one embodiment of the invention, the servers 110 and network devices 120 comprise application servers and data storage servers that are configured to perform data computing and storage functions that support one or more network applications and/or on-line services, for example. The computing system 10 may be implemented in one or more data centers, associated with a private or public entity. In one embodiment, at least a subset of the servers 110 and the network devices 120 comprise respective computers associated with a company, organization or other enterprise. Numerous other operating scenarios involving a wide variety of different types and arrangements of one or more processing devices are possible, as will be appreciated by those skilled in the art.

In another embodiment, the computing system 10 depicted in FIG. 1 may be comprised of a plurality of virtual machines (VMs) that are implemented using a hypervisor. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the computing system 10 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.). A variety of other storage products may be utilized to implement at least a portion of the computing system 10 of FIG. 1.

As further shown in FIG. 1, the network security system 100 comprises a network activity statistics estimator module 140, a statistics data store 150, an anomalous activity detector module 160, a processing unit 170, a system memory 175, a storage interface module 180, and a network interface module 190. In one embodiment of the invention, the network security system 100 implements a statistical-based network security system in which the network security system 100 monitors network activity (e.g., user interaction with the network servers) within the computing system 10 to generate network activity data. The network activity data is processed by the network activity statistics estimator module 140 using statistical models and algorithms to generate baseline statistical data which is indicative of what is deemed to be normal network activity. In one embodiment of the invention, the network activity statistics estimator module 140 utilizes statistical models and algorithms which take into account that the underlying computing system being monitored can change over time (e.g. internet sites occasionally add and remove pages), while users interacting with the underlying computing system can exhibit daily and weekly cyclical patterns, or other cyclical patterns, for example.

In this regard, as explained in further detail below, in one embodiment of the invention, the network activity statistics estimator module 140 is configured to track network activity with regard to user interaction with a computing system to collect "short-term" statistical data of the user interaction with the computing system, wherein the "short-term" statistical data is collected in each of a plurality of sampling intervals (e.g., each sampling interval having a predefined period of about one hour or less), and to apply the collected statistical data to a digital linear recursive filter that is configured to combine and filter the collected statistical data based on at least one cyclical function. In addition, the network activity statistics estimator module 140 is configured to utilize the filtered statistical data to compute final statistics indicative of the user interaction with the computing system.

The final statistics generated by the network activity statistics estimator module 140 include baseline statistical data that is representative of normal network activity, or normal user interaction with the computing system (e.g., what bandwidth is typically used, what communication protocols are generally used, what ports and devices generally connect to each other, etc.). The baseline statistical data is first generated when the network security system 100 is implemented in a given computing system, and then is continually updated during evolution of the computing system. The final statistics generated by the network activity statistics estimator module 140 further comprises real-time statistical data that is continually generated as the network security system 100 monitors the network activity of the underlying computing system for anomalous user interaction and behaviors. The baseline and real-time statistical data generated by the network activity statistics estimator module 140 is stored in the statistics data store 150.

Moreover, the anomalous activity detector module 160 is configured to utilize the final statistics to identify anomalous activity involving the computing system. In particular, in one embodiment of the invention, the anomalous activity detector module 160 is configured to compare the real-time statistical data generated by the network activity statistics estimator module 140 against the current baseline statistical data, and generate an alert when user interaction or network activity is detected as being anomalous (e.g., unknown or rare), or otherwise significantly different than the baseline statistical data. In performing this comparison, the network packets or groups of packets can be given an anomaly score that is indicative of the degree of abnormality for the event associated with that packet or groups of packets. If the anomaly score is higher than a predefined anomaly threshold, the anomalous activity detector module 160 will generate an alert.

In one embodiment of the invention as shown in FIG. 1, the network security system 100 is implemented on one computing node connected to the network 130. In another embodiment of the invention, the network security system 100 is implemented on a plurality of computing nodes, or the functional modules thereof are otherwise distributed over a plurality of computing nodes connected to the network 130. Indeed, depending on the size of the network and the given application(s) of the computing system being monitored, the network security system 100 is placed at one or more strategic points within the given network 130 to monitor network activity of user interaction to and from the various servers 110 and network devices 120 on the network 130. For each computing node in which a network security system 100, or portions thereof, is deployed, the computing mode will have at least one processor and an associated memory, and implements one or more functional modules (e.g., modules 140, 160) for performing the functions of the network security system 100.

The processing unit 170 comprises one or more of a computer processor, a microprocessor, a microcontroller, an application-specific integrated circuit (ASIC), a field programmable gate array (FPGA) or other type of processing circuitry, as well as portions or combinations of such circuitry elements. Furthermore, the system memory 175 comprises electronic memory such as random access memory (RAM), read-only memory (ROM) or other types of memory, in any combination. The system memory 175 stores one or more software programs having instructions that are read and processed by the processing unit 170 to instantiate, or otherwise implement, various functions associated with the network activity statistics estimator module 140 and the anomalous activity detector module 160. In other embodiments, the network activity statistics estimator module 140 and the anomalous activity detector module 160 can be implemented in software, hardware, firmware, or using special purpose ASICS (application specific integrated circuits).

The system memory 175 (and other storage devices described herein) having such program code tangibly embodied thereon is an example of what is more generally referred to herein as a processor-readable storage medium. Other examples of processor-readable storage media embodying program code include, for example, optical or magnetic disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein is understood to specifically exclude transitory, propagating signals.

In one embodiment of the invention, the network interface module 190 is implemented using software and hardware, which is configured to interface and communicate with the network 130 and other components of the computing system 10. The network interface module 190 may comprise conventional transceivers of a type well known in the art.

The storage interface module 180 is configured to enable the network security system 100 to interface with storage devices (e.g., the statistical data store 150) and control the storage of user data and application data which is used to perform network security functions. The storage interface module 180 utilizes one or more of the storage control protocols to read, write and otherwise access data in persistent storage devices (e.g., data store 150) such as flash memory devices, DAS (direct attached storage) devices, NAS (network-attached storage) devices, etc., depending on the storage system utilized. For example, the storage control protocols may include known protocols such as NFS (network file system) and HDFS (Hadoop Distributed File System) protocols, for example.

The statistics data store 150 (and other storage devices) associated with the network security system 100 may comprise, for example, storage products such as VNX® and Symmetrix VMAX®, both commercially available from EMC Corporation of Hopkinton, Mass. A variety of other storage products may be utilized to implement at least a portion of the storage devices (e.g., statistics data store 150).

Also associated with the network security system 100 are input-output devices, which illustratively comprise keyboards, displays or other types of input-output devices in any combination. Such input-output devices are used to support one or more user interfaces to the network security system 100, as well as to support communication between the network security system 100 and other related systems and devices not explicitly shown.

In some embodiments, the network security system 100 is a part of or otherwise associated with another system, such as, for example, a security operations center (SOC) or a critical incident response center (CIRC). Additionally or alternatively, the network security system 100 can be part of or incorporate an otherwise conventional security analytics system, such as the RSA Security Analytics system commercially available from RSA, The Security Division of EMC Corporation of Hopkinton, Mass. Other embodiments can implement the network security system 100 as part of or in conjunction with a security information and event management (SIEM), such as the enVision® platform, also commercially available from RSA. Additional details regarding SIEM systems can be found in, for example, U.S. patent application Ser. No. 12/982,288, filed Dec. 30, 2010 and entitled "Distributed Security Information and Event Management System with Application-Injected Remote Components," which is commonly assigned herewith and incorporated by reference herein.

Figure 2:
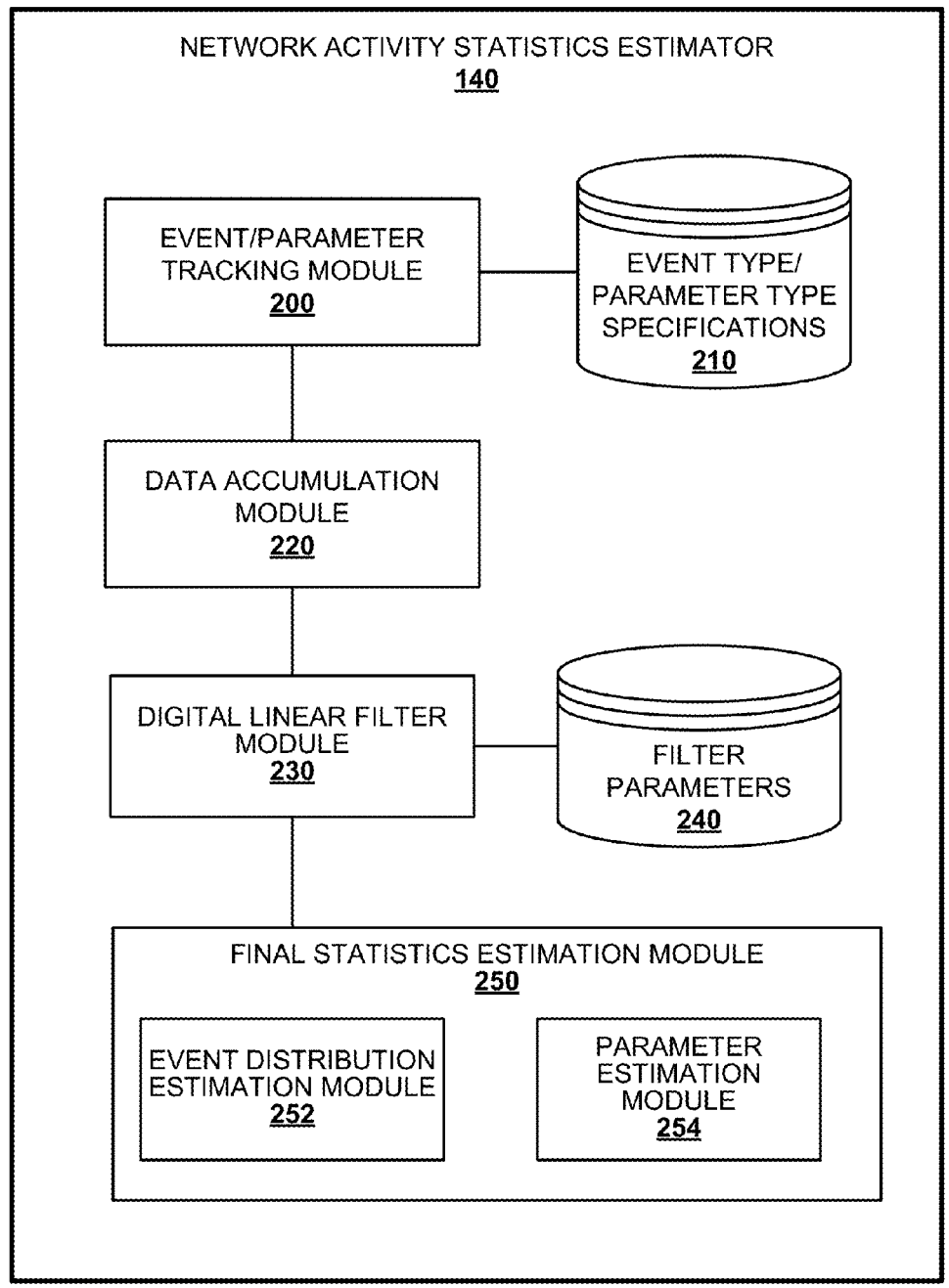
FIG. 2 illustrates an embodiment of a network activity statistics estimator module which is implemented in the network security system of FIG. 1, according to an embodiment of the invention

FIG. 2 illustrates an embodiment of a network activity statistics estimator module which is implemented in the network security system of FIG. 1, according to an embodiment of the invention. The network activity statistics estimator module 140 comprises an event/parameters tracking module 200, event type/parameter type specifications 210, a data accumulation module 220, a digital linear filter module 230, a data store of filter parameters 240, and a final statistics estimation module 250. The final statistics estimation module 250 comprises an event distribution estimation module 252 and a parameter estimation module 254.

The event/parameter tracking module 200 (or simply, tracking module 200) is configured to monitor network activity and log the occurrences of certain pre-specified events and/or track certain pre-specified numerical parameters associated with user interactions and network activity. For instance, a pre-specified event may be, e.g., a visit to a given page of a web application. In such instance, the tracking module 200 would log each user visit or other access to each of one or more pre-specified pages of the web application. In addition, a pre-specified numerical parameter may be, e.g., an amount of time that a user spends visiting a given page of a web application. In such instance, the tracking module 200 would log the time spent on each user visit or other access to each of one or more pre-specified pages of the web application. The types of events and/or parameters that the tracking module 200 is configured to track are specified by the event type/parameter type specifications 210. The types of events and parameters that are tracked will vary depending on the application and the anomalous activity or potential malicious activity to be monitored, for example.

The data accumulation module 220 is configured to accumulate the information tracked by the tracking modules in relatively short time intervals (or sampling intervals) and compute short term statistics in each of the sampling intervals. For example, with regard to pre-specified events that are tracked by the tracking module 200, the data accumulation module 220 is configured to accumulate a number of occurrences of each of the pre-specified events in each sampling interval, and then generate short-term statistics for each event for each sampling interval. Moreover, with regard to pre-specified numerical parameters that are tracked by the tracking module 200, the data accumulation module 220 is configured to accumulate a total amount of each of the pre-specified numerical parameters in each sampling interval, and generate short term statistics for each numerical parameter in each sampling interval.

By way of example, assume that the pre-specified events that are monitored comprise visits to three specific pages of a web application, P1, P2, and P3. Assume further that in given sampling interval S1, page P1 was visited 25 times, page P2 was visited 75 times, and page P3 was visited 100 times. In such instance, the data accumulation module 220 would generate statistical data including a count for each page in the given sampling interval S1, i.e., P1=25, P2=75, and P3=100, and a total count N=200 for the given sampling interval S1 representing the total number of visits to each page P1, P2 and P3 in the given sampling interval S1. By way of further example, assume that pre-specified numerical parameters that are monitored include an average amount of time that users spend visiting each page P1, P2 and P3. In such instance, for a given sampling interval, the data accumulation module 220 would further compute a cumulative parameter value for a given page representing a total amount of time spent on the given page in the given sampling interval. This would allow the system to compute an average time for the given page based on the total accumulated time spent on the page by all users in the given sampling interval divided by the count of user visits to the given page in the given sampling interval.

The sampling interval (e.g., sampling period) is a predefined length of time over which short-term statistics are to be collected by the data accumulation module 220. The length of the sampling interval is preferably selected to be long enough to accumulate meaningful amount of data and reduce numerical instability, yet short enough to preserve ergodicity and stationarity within the sampling period, and to minimize aliasing. For example, the value selected for the sampling interval will depend on factors such as the rate of data collected for a given unit of time, the intended application, the rate of change of statistics of the events/parameters being tracked over the course of a day or a week, and other similar factors. In one embodiment of the invention, for applications in which network activity is being monitored in a computing system implementing a web application (or other similar applications), the sampling interval can be selected to be about an hour or less, and more specifically, in a range of about 10 minutes to about 1 hour.

The short term statistical data collected by the data accumulation module 220 is applied to the digital linear filter module 230, wherein the short term statistical data collected over a multitude of sampling intervals is combined and filtered to provide a set of "long term" statistical data. In one embodiment of the invention, the digital linear filter module 230 comprises a digital linear recursive filter that is configured to model one or more cyclical trends exhibited by users interacting with the underlying computing system being monitored, and optionally configured to model a long-term evolution of the underlying computing system being monitored (e.g., changes in pages of a web application over time).

Although a filter with an arbitrary impulse response can be synthesized and utilized, the resource cost of such implementation can be prohibitive. In this regard, in one embodiment of the invention, a relatively low complexity filtering system with the desired behavior is implemented using a digital linear recursive filter that is based on a continuous time filter with an impulse response function h(t) defined as:

$$h(t) = \{e^{-t/\mu}[a_0 + a_1 \cos(\omega_1 t) + a_2 \cos(\omega_2 t)]\}u(t) \qquad \text{Eq. (1)}$$

wherein $e^{-t/\mu}$ corresponds to a decay function, and $\mu$ represents a predefined half-life time constant of the collected statistical data, wherein $a_0$, $a_1$, and $a_2$ are filter coefficients, wherein $\omega_1$ corresponds to a first frequency of a first cyclical function, wherein $\omega_2$ corresponds to a second frequency of a second cyclical function, and wherein u(t) represents a unit step function. In one embodiment of the invention, the sum of the coefficient $a_0 + a_1 + a_2 = 1$, and $a_0 > a_1 + a_2$ to ensure that h(t)>0. In addition, in one embodiment of the invention, $\omega_1 = 2\pi/1$ day (daily cycle), and wherein $\omega_2 = 2\pi/1$ week (weekly cycle).

Figure 3:
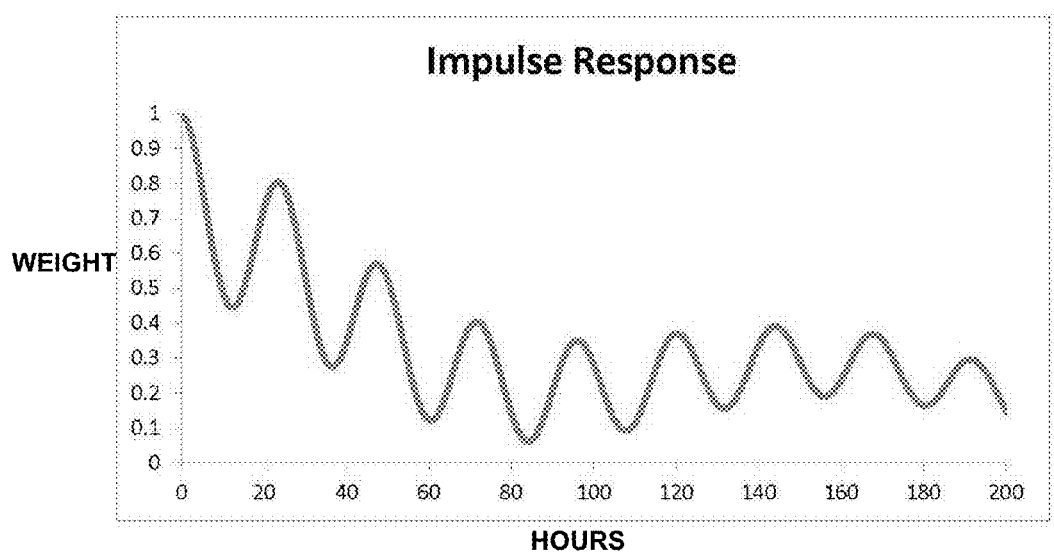
FIG. 3 illustrates an impulse response function which used to implement a digital linear filter configured to combine and filter collected statistical data of network activity, according to an embodiment of the invention.

FIG. 3 graphically illustrates an impulse response 300 of the function h(t) of Eq. (1). The impulse response 300 of FIG. 3 illustrates how much contribution that statistical data collected in a current time period will have to the overall statistics at a future time. In FIG. 3, the y axis represents a weight value and the x axis represents a time scale from 0 to 200 hours. As depicted in FIG. 3, statistical data collected at a current time t=0 will contribute to the overall statistics with a full weight of 1.

As further shown in FIG. 3, the impulse response 300 has a decaying trend over time, which represents that the currently collected statistical data contributes to the overall statistics with decreasing weight over time. In one embodiment of the invention, this decay mechanism is implemented using the decay component $e^{-t/\mu}$ of the function h(t) of Eq. (1). In one embodiment of the invention, the decay component $e^{-t/\mu}$ is implemented as part of the filter function to model a slow term evolution of an underlying computing system being monitored. In other words, the decay component $e^{-t/\mu}$ takes into account that the statistical data collected over time can change because of dynamic variations or changes to the underlying computing system (e.g., updating, changing, and/or deleting pages of a web application, etc.). In this regard, the decay component $e^{-t/\mu}$ ensures that currently collected statistics will have decreasing weight (and less contribution to the overall statistics) at some later time, as compared to new statistics that will collected at that later time, and which more accurately reflect a current state of the underlying computing system at that later time.

In addition, the impulse response 300 shown in FIG. 3 has a sinusoidal pattern, which represents cyclical trends exhibited by users interacting with the underlying computing system. In one embodiment of the invention, this sinusoidal pattern is implemented using the weighted cosine functions $a_1 \cos(\omega_1 t)$ and $a_2 \cos(\omega_2 t)$ of the function h(t) of Eq. (1). In one embodiment of the invention, the weighted cosine function $a_1 \cos(\omega_1 t)$ is implemented as part of the filter function to model daily cyclical patterns exhibited by users interacting with the underlying system (wherein the period of the weighted cosine function $a_1 \cos(\omega_1 t)$ represents a daily period). In addition, the weighted cosine function $a_2 \cos(\omega_2 t)$ is implemented as part of the filter function to model weekly cyclical patterns exhibited by users interacting with the underlying system (wherein the period of the weighted cosine function $a_2 \cos(\omega_2 t)$ represents a weekly period).

These weighted cosine functions $a_1 \cos(\omega_1 t)$ and $a_2 \cos(\omega_2 t)$ take into account that the statistical data collected over a day or a week, for example, can change due to cyclical patterns of user behavior that can vary throughout the day or over a week. For example, while patterns of user behavior and interaction with a computing system may be different at 12:00 pm in the afternoon as compared to 12:00 am midnight, the daily user behavior patterns may be the same at the same times each day (same normal behaviors at afternoon, and same normal behaviors at midnight).

By construction, the function h(t) of Eq. (1) incorporates decay and cyclical functions to model both slow long term evolution of underlying systems, and cyclical trends exhibited by users. In one embodiment of the invention, the continuous time filter function h(t) of Eq. (1) is implemented as a digital linear recursive filter system as follows. Initially, a Laplace Transform is applied to generate a continuous frequency domain equivalent of the continuous time filter function h(t) of Eq. (1). The corresponding Laplace transform of the impulse response function h(t) of Eq. (1) is as follows:

$$H(s) = \frac{a_0}{s + 1/\mu} + \frac{a_1\left(s + \frac{1}{\mu}\right)}{\left(s + \frac{1}{\mu}\right)^2 + \omega_1^2} + \frac{a_2\left(s + \frac{1}{\mu}\right)}{\left(s + \frac{1}{\mu}\right)^2 + \omega_2^2} \quad \text{Eq. (2)}$$

wherein the "DC gain" of the filter is:

$$H(0) = \mu\left(a_0 + \frac{a_1}{1 + \mu^2\omega_1^2} + \frac{a_2}{1 + \mu^2\omega_2^2}\right). \quad \text{Eq. (3)}$$

To implement a digital linear recursive filter in software, the continuous frequency domain representation of Eq. (2) is converted to a discrete frequency representation using a Z transform. Initially, a sampling period T is selected as noted above, wherein the length of the sampling period is chosen long enough to accumulate meaningful amount of statistical data and reduce numerical instability, yet short enough to preserve ergodicity within the sampling period and to minimize aliasing. Among different methods to discretize the continuous filter, the impulse invariant transform is most appropriate, since it most closely preserves the impulse response. The resulting Z transform becomes:

$$H(z) = a_0/(1-\exp(-T/\mu)z^{-1}) + a_1(1-\exp(-T/\mu)\cos(\omega_1 T)z^{-1})/(1-2\exp(-T/\mu)\cos(\omega_1 T)z^{-1} + \exp(-T/\mu)z^{-2}) + a_2(1-\exp(-T/\mu)\cos(\omega_2 T)z^{-1})/(1-2\exp(-T/\mu)\cos(\omega_2 T)z^{-1} + \exp(-T/\mu)z^{-2}). \quad \text{Eq. (4)}$$

In one embodiment of the invention, using a filter representation in parallel form, an input sequence x(n) and an output sequence y(n) of a digital linear recursive filter is provided as:

$$y(n) = a_0 y_0(n) + a_1 y_1(n) + a_2 y_2(n) \quad \text{Eq. (5)}$$

wherein:

$$y_0(n) = x(n) + \exp(-T/\mu) y_0(n-1)$$

$$y_1(n) = x(n) - \exp(-T/\mu)\cos(\omega_1 T)x(n-1) + 2\exp(-T/\mu)\cos(\omega_1 T)y_1(n-1) - \exp(-2T/\mu)y_1(n-2)$$

$$y_2(n) = x(n) - \exp(-T/\mu)\cos(\omega_2 T)x(n-1) + 2\exp(-T/\mu)\cos(\omega_2 T)y_2(n-1) - \exp(-2T/\mu)y_2(n-2).$$

The digital linear recursive filter of Eq. (5) is a discrete time implementation of the Z transform of Eq. (4). The term x(n) represents a sequence of data that is generated by the data accumulation module 220. In particular, x(n) comprises a sequence of data values, wherein each data value represents an accumulated value for a given event or parameter in a given sampling period. For example, continuing with the above example, wherein it is assumed that the pre-specified events that are monitored comprise visits to three specific pages of a web application, P1, P2, and P3, a sequence of data values x(n) would be generated for each page P1, P2, and P3. The sequence of data values x(n) for a given page would comprise a sequence of count values which represent the number of visits of the given page in each of a corresponding sequence of sampling periods.

Moreover, the term y(n) represents a sequence of filtered data values for a given event or parameter, which is computed by applying a corresponding sequence of data values x(n) for the given event or parameter to the digital linear recursive filter of Eq. (5). For example, in the above example where the pre-specified events comprise visits to the pages P1, P2, and P3 of the web application, the filtered data sequence y(n) for each page P1, P2, and P3 would be computed by applying the respective sequence of count data values x(n) of the pages P1, P2, and P3 to the digital linear recursive filter of Eq. (5). As illustrated above, the filter components $y_0(n)$, $y_1(n)$, $y_2(n)$ are generated based on a current data value x(n), as well as one or more past data values x(n−1) and x(n−2).

In one embodiment of the invention, the various filter parameters, e.g., $a_0$, $a_1$, $a_2$, $\mu$, and T, shown in Eq. (5) comprise filter configuration data that are persistently stored in the data store of filter parameters 240. These parameters can be modified or otherwise selected based on the given application or operating conditions of the underlying computing system. More specifically, the parameters $a_0$, $a_1$, $a_2$, and $\mu$ are set by system administrators who have some understanding of the evolution of the underlying computing system (e.g., internet site), and the manner in which users are interacting the computing system. The filter parameters $a_1$ and $a_2$ represent a degree to which aggregate behavior (e.g. traffic intensity) cyclically varies over the course of a day and the course of a week, respectively. For example, if the network traffic patterns are the same every day of the week, then $a_2 = 0$ (no weekly cycles). Conversely, if every Friday and Sunday the pattern of network traffic changes dramatically, the parameter $a_2$ will be increased. The same considerations apply for setting the parameter $a_1$ for daily cycles. In one embodiment of the invention, constraints (derived from Eq. (4)) are $a_1 + a_2 < 0.5$, and $a_0 = 1 - a_1 + a_2$.

Furthermore, in one embodiment of the invention, the half-life parameter $\mu$ is set with a value that is approximately equal to the period of time at which system changes take place (e.g. new pages added, old pages deleted). The "obsolescence" trend is a term that is used herein to denote the fact that currently collected data will become obsolete and irrelevant at some point in the future. Effectively, statistical data that is collected at a given time has a limited lifespan which is characterized by the half-life parameter $\mu$.

The following example provides an implementation of a digital linear recursive filter, wherein it is assumed that the weights of the obsolescence, daily and weekly trends are $a_0 = 0.6$, $a_1 = 0.25$, and $a_2 = 0.15$, respectively, wherein the half-life $\mu$ of the digital linear recursive filter is one week, and wherein the sampling period, T, that is the period over which short-term statistics are collected, is ¼ hour:

$$\exp(-T/\mu) = \exp(-¼/(24 \text{ hrs}*7 \text{ days})) = 0.998513$$

$$\cos(\omega_1 T) = \cos(¼*2\pi/24 \text{ hrs}) = 0.997859$$

$$\cos(\omega_2 T) = \cos(¼*2\pi/(24 \text{ hrs}*7 \text{ days})) = 0.999956$$

$$y(n)=0.6y_0(n)+0.25y_1(n)+0.15y_2(n)$$

wherein, $$y_0(n)=x(n)+0.998513y_0(n-1)$$

$$y_1(n)=x(n)-0.996375x(n-1)+1.992750y_1(n-1)-0.997028y_1(n-2)$$

$$y_2(n)=x(n)-0.998469x(n-1)+1.996939y_2(n-1)-0.997028y_2(n-2).$$

In another embodiment of the invention, the decay component $e^{-t/\mu}$ of the function h(t) of Eq. (1) is an optional component that is implemented as part of the filter function to model the slow long term evolution of the underlying computing system being monitored. For computing systems that are relativity static and do not dynamically vary or change over time, or otherwise do change over time but in way that would have little impact on the ability to detect anomalous network behaviors, the decay component $e^{-t/\mu}$ can be eliminated. In such embodiment, the function h(t) of Eq. (1) is modified as follows:

$$h(t)=\{[a_0+a_1\cos(\omega_1 t)+a_2\cos(\omega_2 t)]\}u(t). \quad \text{Eq. (1A)}$$

Further, the corresponding digital linear recursive filter implementation without the decay component is as follows:

$$H(z)=a_0/(1-z^{-1})+a_1(1-\cos(\omega_1 T)z^{-1})/(1-2\cos(\omega_1 T)z^{-1}+z^{-2})+a_2(1-\cos(\omega_2 T)z^{-1})/(1-2\cos(\omega_2 T)z^{-1}+(-T/\mu)z^{-2}). \quad \text{Eq. (4A)}$$

In other embodiments of the invention, a digital linear recursive filter can be implemented without a decay function and without a weekly cyclical function. In other words, a digital linear recursive filter can be implemented with only a daily cyclical function, for example. In yet another embodiment of the invention, in addition to a daily cyclical function and a weekly cyclical function, a digital linear recursive filter can be implemented with a monthly cyclical function. In this regard, it is to be understood that depending on the application, varying types of digital linear recursive filters can be implemented with or without decay functions and/or including one or more cyclical functions.

Referring back to FIG. 2, the filtered statistical data that is output from the digital linear filter module is input to the final statistics estimation module 250. The final statistics estimation module 250 is configured to compute final statistics of user interaction with the computing system. In one embodiment of the invention, the final statistics estimation module 250 utilizes the event distribution estimation module 252 to estimate categorical distributions, e.g., probability distributions of certain events (e.g. distribution of page visits). In another embodiment, the final statistics estimation module 250 utilizes the parameter estimation module 254 to estimate numerical parameters (e.g., mean transition time from one page to another).

To estimate a probability distribution, assume that in the underlying computing system C distinct events $\{c_k\}_C$ can occur. Equivalently, we consider a random variable y which has C outcomes $\{c_k\}_C$ with underlying probability distribution $p(c_k)$. Assuming that there is a total of N observations of y, and that each outcome of $c_k$ occurs $N_k$ times, the final statistics estimation module 250 is configured to estimate distribution $\hat{p}(c_k)$ of y.

There are two approaches that can be utilized to estimate the final statistics, including frequentist and Bayesian. A frequentist technique yields a maximum likelihood estimate:

$$\hat{p}(c_k)=N_k/N, \quad \text{Eq. (6)}$$

where $$N=\Sigma_k N_k, \quad \text{Eq. (7)}$$

while a Bayesian technique provides:

$$\hat{p}(c_k)=(N_k+1)/(N+C). \quad \text{Eq. (8)}$$

Both the frequentist and Bayesian techniques yield the same result when $N\to\infty$. However, the results are vastly different when N is small, and especially when C is large. In some cases, $\lambda$ smoothing is used as a compromise:

$$\hat{p}(c_k)=(N_k+\lambda)/(N+\lambda C), 0\le\lambda\le 1. \quad \text{Eq. (9)}$$

In one embodiment of the invention, as explained in further detail below, the event distribution estimation module 252 is configured to perform a probability estimation function based on Eq. (9). The computation function of Eq. (9) is a compromise between Eqs. (6)/(7) and Eq. (8), wherein the $\lambda$ smoothing is implemented. The choice of is somewhat arbitrary. Smaller values of $\lambda$ accelerate the transition of the estimate from Bayesian to maximum likelihood as N increases. In practice, for the estimate to be useful, N should be considerably greater than C, at which point the choice of the estimate is not critical. Still some form of $\lambda$ smoothing is preferred to eliminate the possibility of estimates with values of 0 or 1.

Similarly, a parameter estimation function is implemented by the parameter estimation module 254, except that instead of counting a number of event occurrences, the relevant parameters are accumulated, and then averages (e.g., statistical means) of the accumulated parameters are estimated. In particular, in one embodiment of the invention, let's assume the underlying computing system has a total of N observations, each outcome of $c_k$ occurring $N_k$ times. Each observation has an associated parameter $t_{i,k}$ where k indicates that the given event has the outcome $c_k$, and $i\in[1, N_k]$ is the index of $c_k$ occurring. An estimate of the mean of the parameter for the event type $c_k$ is given by:

$$\hat{t}_k = \frac{t_k + \lambda}{N_k + \lambda/\hat{t}}, 0 \le \lambda \le 1, \quad \text{Eq. (10)}$$

wherein the parameter $t_k$ is a cumulative parameter over all occurrences of event type $$c_k : t_k = \sum_{i=1}^{N_k} t_{i,k},$$

and $\hat{t}$ is the overall average:

$$\hat{t} = \frac{\sum_k t_k}{N}.$$

In additions, the choice of $\lambda$ is not critical, as it only takes effect when the value of $N_k$ is small.

In one embodiment of the invention, the event distribution estimation module 252 is configured to perform a probability distribution estimation function based on Eq. (9), and the parameter estimation module 254 is configured to perform a parameter estimation function based on Eq. (10). The following examples illustrate modes of operation of the final statistics estimation module 250.

Assume that the following statistical data shown in Table 1 is collected by the data accumulation module 220:

TABLE 1

| Event | Sampling Interval - S0 | Sampling Interval - S1 | Sampling Interval - S2 |
|---|---|---|---|
| c1 | Count = 20 | Count = 22 | Count = 19 |
| c2 | Count = 10 | Count = 8 | Count = 9 |
| c3 | Count = 34 | Count = 30 | Count = 32 |
| | Total N = 64 | Total N = 60 | Total N = 60 |

For illustrative purposes, TABLE 1 shows three different events c1, c2 and c3, wherein each row corresponds to a given one of the events and contains a count of the number of occurrences of the given event in each of a plurality of sequential sampling intervals S0, S1 and S2. The last row in TABLE 1 lists a total N of all events occurring in the respective sampling intervals S0, S1 and S2. For instance, with regard to event c1, TABLE 1 shows that the event c1 has a count of 20, 22 and 19 in respective sampling intervals S0, S1, and S2. Continuing with the above example wherein the events represent visits to pages of a web application, the event c1 can represent user visits to page P1, event c2 can represent user visits to page P2, and event c3 can represent user visits to page P3 of the web application.

The statistical data shown in TABLE 1 is applied to the digital linear filter module 230 wherein the sequences of counts for each event would be separately applied to the digital linear recursive filter of Eq. (5) to yield separate output sequences y(n) for each of the events c1, c2, and c3. The output sequences y(n) for a given one of the events $c_k$ represent the $N_k$ values that are applied in Eq. (9) to compute a probability distribution for the given event. Moreover, the digital linear recursive filter of Eq. (5) is applied to the count values N shown in the last row of TABLE 1 to compute an effective data size value N which is applied in Eq. (9) to compute the probability distribution for the given event. In other words, the filtering results which are generated by applying the kth row and the last row (total counts) to the digital linear recursive filter of Eq. (5) are input to the event probability distribution computation of Eq. (9). In the above example, the probability distribution computation of Eq. (9) results in a determination of the probability of users visiting pages of a web application, for example.

An analogous process is used for estimating numeric parameters using Eq. (10). As noted above, the parameter estimation module 254 is configured to estimate a numeric value of a given system variable (as opposed to computing a probability distribution of various possibilities (e.g., outcomes) of certain events). For example, continuing with the above example, assume that the numeric value being tracked is an amount of time that users spend visiting each page of the underlying computing system (e.g., pages P1, P2 and P3). In such instance, for a given sampling interval, the data accumulation module 220 would further compute a cumulative parameter value for a given page representing a total amount of time spent on the given page in the given sampling interval. Therefore, in addition to the page counts shown in TABLE 1, the cumulative parameter values (total time spent on a given page in a given sampling interval) would be filtered using the digital linear recursive filter of Eq. (5) to compute the values of $t_k$ that would be applied to the computation of Eq. (10). The value of $N_k$ in Eq. (10) would be computed as discussed above for the given example.

In one embodiment of the invention, for a practical implementation of the digital linear recursive filter of Eq. (5), certain parameters are taken into consideration with regard to, e.g., precision requirements, computational load, and memory usage. For example, precision considerations account for two factors: incrementing (by one or some other small number) of very large numbers, and avoiding rounding errors when performing filtering arithmetic. In one embodiment of the invention, the accumulators of short term values $N_k$ and $T_k$ should be represented as integers (or long integers). Indeed, floating point representation is not optimal for this purpose since floating-point accumulators stop accumulating once the accumulator values become very large. On the other hand, it is preferable for the digital linear recursive filtering of Eq. (5) to be performed at a maximum available precision. Therefore, in one embodiment of the invention, the input values x(.) in Eq. (5) are integers, while the output values y(.) are floating point values.

With regard to computational requirements, the system complexity is on the order of the cardinality of the distributions, and computation is performed once per sampling period which, in one embodiment of the invention, is measured in tens of minutes. However, memory requirements can be substantial for high cardinality distributions. In particular, if the memory size for a given model is X, the memory requirement for a given implementation of the digital linear recursive filtering can be 8X. To optimize memory accesses, most of the data can be swapped out to a disk until the update procedure is invoked, at which point the data can be swapped back into memory in small increments.

Figure 4:
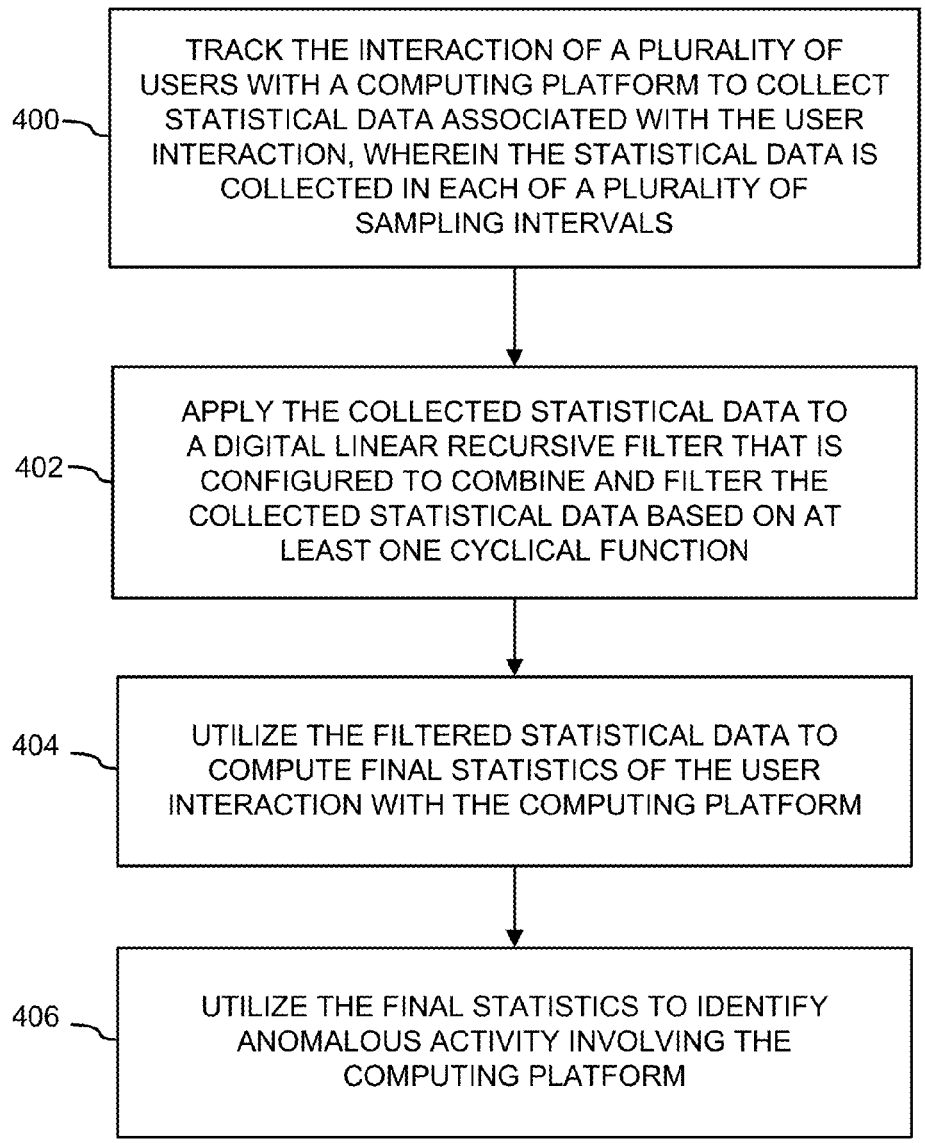
FIG. 4 is a flow diagram of method for estimating network activity statistics for use in detecting anomalous activity in a computer network, according to an embodiment of the invention.

FIG. 4 is a flow diagram of method for estimating network activity statistics for use in detecting anomalous activity in a computer network, according to an embodiment of the invention. In particular, FIG. 4 illustrates a mode of operation of the network activity statistics estimator module 140 and the anomalous activity detector module 160 of FIG. 1. For purposes of illustration, the flow diagram of FIG. 4 may be further discussed in the context of the embodiment of the network activity statistics estimator module 140 shown in FIG. 2.

Referring to FIG. 4, an initial process is performed to track the interaction of a plurality of users with a computing system to collect statistical data associated with the user interaction with the computing system, wherein the statistical data is collected in each of a plurality of sampling intervals (block 400). For example, as discussed above, in one embodiment of the invention, the tracking module 200 and data accumulation module 220 are configured to track one or more pre-specified events, and accumulate a number of occurrences of each of the one or more pre-specified events in each of the plurality of sampling intervals. In another embodiment, the tracking module 200 and data accumulation module 220 are configured to track one or more pre-specified numerical parameters, and accumulate a total amount of each of the one or more pre-specified numerical parameters in each of the plurality of sampling intervals. As noted above, in one embodiment of the invention, each sampling interval has a predefined period of about one hour or less.

Next, the collected statistical data is applied to a digital linear recursive filter that is configured to combine and filter the collected statistical data based on at least one cyclical function (block 402). For example, as noted above, the statistical data that is collected and accumulated by the data accumulation module 220 is input to the digital linear filter module 230 which combines and filters the statistical data using a digital linear recursive filter. In one embodiment of the invention, the at least one cyclical function of the digital linear recursive filter comprises a weighted function of a daily cycle, or a weighted function of a weekly cycle, or both. In another embodiment of the invention, the digital linear recursive filter is further configured to combine and filter the collected statistical data based on a decay function, wherein the decay function is based on an exponential of a ratio of a predefined time period of each sampling interval to a predefined half-life time constant of the collected statistical data. In one embodiment, the half-life time constant is about one week.

Next, the filtered statistical data is utilized to compute final statistics of the user interaction with the computing system (block 404). For example, in one embodiment of the invention, the filtered statistical data is utilized to compute a categorical probability distribution for each of the one or more pre-specified events using a computation process based on Eq. (9), for example. In another embodiment of the invention, the filtered statistical data is utilized to compute a statistical mean of each of the one or more pre-specified numerical parameters using a computation process based on Eq. (10), for example.

The final statistics are then utilized to identify anomalous activity involving the computing system (block 406). For example, as noted above, in one embodiment of the invention, the network activity statistics estimator module 140 is configured to compute baseline and real-time statistical data using the processes of blocks 400, 402 and 404 of FIG. 4. The anomalous activity detector module 160 of FIG. 1 is configured to compare the real-time statistical data generated by the network activity statistics estimator module 140 against the current baseline statistical data, and generate an alert when user interaction or network activity is detected as being anomalous (e.g., unknown or rare), or otherwise significantly different than the baseline statistical data.

It is to be understood that the particular processing operations and other network functionality described in conjunction with FIGS. 2 and 4, for example, are presented by way of illustrative example only, and should not be construed as limiting the scope of the invention in any way. Alternative embodiments can use other types of processing operations and modules to implement the functions described with reference to the modules of FIG. 2 and the flow diagram of FIG. 4. For example, the ordering of the process steps may be varied in other embodiments, or certain steps may be performed concurrently with one another rather than serially.

In addition, many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. Moreover, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising steps of:
    tracking interaction of a plurality of users with a computing system to collect statistical data of said user interaction, wherein the statistical data is collected in each of a plurality of sampling intervals;
    applying the collected statistical data to a digital linear recursive filter that is configured to combine and filter the collected statistical data, wherein the digital linear recursive filter comprises a discrete time implementation of a continuous time filter with an impulse response function that is defined, at least in part, by at least one cyclical function that represents a cyclical trend exhibited by the plurality of users interacting with the computing system;
    utilizing the filtered statistical data to compute final statistics of said user interaction with the computing system; and
    utilizing the final statistics to identify anomalous activity involving the computing system,
    wherein the tracking, applying, and utilizing steps are performed by at least one processing device comprising a processor coupled to a memory.

2. The method of claim 1 wherein each sampling interval has a predefined period which is greater than zero, but less than or equal to one hour.

3. The method of claim 1 wherein the impulse response function is further defined based on a decay function.

4. The method of claim 3 wherein the decay function is based on an exponential of a ratio of a predefined time period of each sampling interval to a predefined half-life time constant of the collected statistical data.

5. The method of claim 4 wherein the half-life time constant is one week.

6. The method of claim 1 wherein the at least one cyclical function comprises a weighted sinusoidal function of a daily cycle.

7. The method of claim 1 wherein the at least one cyclical function comprises a weighted sinusoidal function of a weekly cycle.

8. The method of claim 1 wherein the impulse response function is defined as:

$$h(t)=\{e^{-t/\mu}[a_0+a_1\cos(\omega_1 t)+a_2\cos(\omega_2 t)]\}u(t);$$

wherein $e^{-t/\mu}$ corresponds to a decay function, and $\mu$ represents a predefined half-life time constant of the collected statistical data;
wherein $a_0$, $a_1$, and $a_2$ are filter coefficients;
wherein $\omega_1$ corresponds to a first frequency of a first cyclical function;
wherein $\omega_2$ corresponds to a second frequency of a second cyclical function; and
wherein u(t) represents a unit step function.

9. The method of claim 8,
wherein $a_0+a_1+a_2=1$ and $a_0>a_1+a_2$,
wherein $\omega_1=2\pi/1$ day, and
wherein $\omega_2=2\pi/1$ week.

10. The method of claim 1 wherein tracking interaction of a plurality of users with the computing system to collect statistical data of said user interaction comprises:
    tracking one or more pre-specified events; and
    accumulating a number of occurrences of each of the one or more pre-specified events in each of the plurality of sampling intervals.

11. The method of claim 10 wherein utilizing the filtered statistical data to compute final statistics comprises computing a categorical probability distribution for each of the one or more pre-specified events.

12. The method of claim 1 wherein tracking interaction of a plurality of users with the computing system to collect statistical data of said user interaction comprises:
    tracking one or more pre-specified numerical parameters; and accumulating a total amount of each of the one or more pre-specified numerical parameters in each of the plurality of sampling intervals.

13. The method of claim 12 wherein utilizing the filtered statistical data to compute final statistics comprises computing a statistical mean of each of the one or more pre-specified numerical parameters.

14. The method of claim 1 wherein utilizing the final statistics to identify anomalous activity involving the computing system comprises utilizing the final statistics to identify one or more anomalies in said user interaction with the computing system.

15. An article of manufacture comprising a processor-readable storage medium having stored therein program code of one or more software programs, wherein the program code when executed by at least one processing device causes said at least one processing device:
    to track interaction of a plurality of users with a computing system to collect statistical data of said user interaction, wherein the statistical data is collected in each of a plurality of sampling intervals;
    to apply the collected statistical data to a digital linear recursive filter that is configured to combine and filter the collected statistical data, wherein the digital linear recursive filter comprises a discrete time implementation of a continuous time filter with an impulse response function that is defined, at least in part, by at least one cyclical function that represents a cyclical trend exhibited by the plurality of users interacting with the computing system;
    to utilize the filtered statistical data to compute final statistics of said user interaction with the computing system; and
    to utilize the final statistics to identify anomalous activity involving the computing system.

16. The article of manufacture of claim 15 wherein each sampling interval has a predefined period which is greater than zero, but less than or equal to one hour, wherein the impulse response function is further defined based on a decay function, and wherein the decay function is based on an exponential of a ratio of a predefined time period of the sampling intervals to a predefined half-life time constant of the collected statistical data.

17. The article of manufacture of claim 16 wherein the at least one cyclical function comprises at least one of a weighted sinusoidal function of a daily cycle, a weighted sinusoidal function of a weekly cycle, or both.

18. An apparatus comprising:
    at least one processing device comprising a processor coupled to a memory, wherein the at least one processor device is configured to process program code stored in the memory to instantiate a network activity statistics estimator module and to instantiate an anomalous activity detector module;
    wherein the network activity statistics estimator module is configured:
        to track interaction of a plurality of users with a computing system to collect statistical data of said user interaction, wherein the statistical data is collected in each of a plurality of sampling intervals;
        to apply the collected statistical data to a digital linear recursive filter that is configured to combine and filter the collected statistical data, wherein the digital linear recursive filter comprises a discrete time implementation of a continuous time filter with an impulse response function that is defined, at least in part, by at least one cyclical function that represents a cyclical trend exhibited by the plurality of users interacting with the computing system; and
        to utilize the filtered statistical data to compute final statistics of said user interaction with the computing system; and
    wherein the anomalous activity detector module is configured to utilize the final statistics to identify anomalous activity involving the computing system.

19. A computer network comprising the apparatus of claim 18.

20. A network security system comprising the apparatus of claim 18.

* * * * *